(12) United States Patent
Masui

(10) Patent No.: US 11,375,079 B2
(45) Date of Patent: Jun. 28, 2022

(54) IMAGE READING APPARATUS INCLUDING A FIRST LAMP AND SECOND LAMP THAT ALTERNATELY TURN ON, WHEREIN THE FIRST LAMP TURNS ON DURING READING ODD-NUMBERED LINES AND THE SECOND LAMP TURNS ON DURING READING EVEN-NUMBERED LINES AND SYNTHESIZES THE FIRST IMAGE DATA READ FROM TURNING ON THE FIRST LAMP AND THE SECOND IMAGE DATA READ FROM TURNING ON THE SECOND LAMP

(71) Applicant: KYOCERA Document Solutions Inc., Osaka (JP)

(72) Inventor: Shuichi Masui, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/064,837

(22) Filed: Oct. 7, 2020

(65) Prior Publication Data

US 2021/0120140 A1 Apr. 22, 2021

(30) Foreign Application Priority Data

Oct. 21, 2019 (JP) .............................. JP2019-192030

(51) Int. Cl.
*H04N 1/00* (2006.01)
*H04N 1/053* (2006.01)
(Continued)

(52) U.S. Cl.
CPC ........... *H04N 1/053* (2013.01); *H04N 1/0288* (2013.01)

(58) Field of Classification Search
CPC .......... H04N 1/00708; H04N 1/00718; H04N 1/00769; H04N 1/0288; H04N 1/053;
(Continued)

(56) References Cited

U.S. PATENT DOCUMENTS 5,969,372 A * 10/1999 Stavely .............. G01N 21/8806
250/559.42
6,456,748 B1 * 9/2002 Yushiya ................. H04N 1/484
382/312

(Continued)

FOREIGN PATENT DOCUMENTS

JP 2003-244403 8/2003
JP 2003244403 A * 8/2003 ............... H04N 1/04

*Primary Examiner* — Chad Dickerson
(74) *Attorney, Agent, or Firm* — Lex IP Meister, PLLC

(57) ABSTRACT

A carriage of an image reading apparatus includes a first lamp and a second lamp. A moving mechanism moves the carriage in a sub-scanning direction from a first side to a second side. The first lamp and the second lamp are arranged in a row in the sub-scanning direction. A control unit turns on any one of the first lamp and the second lamp during reading of one line. The control unit recognizes the position of a first-side edge based on first image data obtained when the first lamp is turned on. The control unit recognizes the position of a second-side edge based on second image data obtained when the second lamp is turned on. The control unit synthesizes the first image data and the second image data to generate job read image data.

7 Claims, 12 Drawing Sheets

(51) Int. Cl.
*H04N 1/028* (2006.01)
*G06F 3/12* (2006.01)

(58) Field of Classification Search
CPC .............. H04N 1/0287; H04N 1/3876; H04N 1/02845; H04N 1/02865
USPC .......... 358/1.5, 450, 540, 1.9, 2.1, 406, 506, 358/509, 514, 515
See application file for complete search history.

(56) References Cited

U.S. PATENT DOCUMENTS

| | | | |
|---|---|---|---|
| 6,603,572 B1* | 8/2003 | Nakatani | H04N 1/0405 358/472 |
| 2008/0231877 A1* | 9/2008 | Ono | H04N 1/58 358/1.9 |
| 2009/0002774 A1* | 1/2009 | King | H04N 1/3876 382/275 |
| 2013/0070312 A1* | 3/2013 | Saiga | H04N 1/02885 358/474 |
| 2016/0295061 A1* | 10/2016 | Nishida | H04N 1/02885 |
| 2017/0126915 A1* | 5/2017 | Ishido | H04N 1/00793 |
| 2017/0187919 A1* | 6/2017 | Kim | H04N 1/486 |
| 2019/0230251 A1* | 7/2019 | Maeda | H04N 1/484 |

* cited by examiner

IMAGE READING APPARATUS INCLUDING A FIRST LAMP AND SECOND LAMP THAT ALTERNATELY TURN ON, WHEREIN THE FIRST LAMP TURNS ON DURING READING ODD-NUMBERED LINES AND THE SECOND LAMP TURNS ON DURING READING EVEN-NUMBERED LINES AND SYNTHESIZES THE FIRST IMAGE DATA READ FROM TURNING ON THE FIRST LAMP AND THE SECOND IMAGE DATA READ FROM TURNING ON THE SECOND LAMP

INCORPORATION BY REFERENCE

This application is based upon, and claims the benefit of priority from, corresponding Japanese Patent Application No. 2019-192030 filed in the Japan Patent Office on Oct. 21, 2019, the entire contents of which are incorporated herein by reference.

BACKGROUND

Field of the Invention

The present disclosure relates to an image reading apparatus that reads a document.

Description of Related Art

An image reading apparatus reads a document to generate image data. Some image reading apparatuses move a light source in a sub-scanning direction. When the light source is moved, the light irradiation position on a document on a platen is moved. That is, the position of the read line is moved. This type of image reading apparatus with a movable light source may detect the size of the document in the sub-scanning direction (the moving direction of the light source). Typically, to detect the size in the sub-scanning direction, the light source is moved back and forth multiple times for the document and the scanning is repeated correspondingly to multiple surfaces so that the document size is detected and the document image data is acquired.

SUMMARY

The image reading apparatus according to the present disclosure includes a platen, a carriage, a moving mechanism, a line sensor, and a control unit. A document is set on the platen. The carriage includes a first lamp and a second lamp. The moving mechanism moves the carriage in the sub-scanning direction from a side of the platen on a first side to a side of the platen on a second side in response to the start of reading of the document, the sides being opposed to each other in the sub-scanning direction. The line sensor reads the document based on reflected lights of the first lamp and the second lamp. The first lamp and the second lamp are arranged in a row in the sub-scanning direction. The first lamp emits light toward the platen and the set document along a main scanning direction when the first lamp is turned on. The first lamp is located on the second side as compared with positions of the second lamp and a read line of the line sensor in the sub-scanning direction. The second lamp emits light toward the platen and the set document along the main scanning direction when the second lamp is turned on. The second lamp is located on the first side as compared with positions of the first lamp and the read line in the sub-scanning direction. The control unit turns on any one of the first lamp and the second lamp during reading of one line. The control unit recognizes a position of a first-side edge based on first image data that is image data read when the first lamp is turned on. The control unit recognizes a position of a second-side edge based on second image data that is image data read when the second lamp is turned on. The control unit synthesizes the first image data and the second image data to generate job read image data that is image data used for a job. The first-side edge is an edge of the document on the first side out of edges opposed to each other in the sub-scanning direction. The second-side edge is an edge of the document on the second side out of the edges opposed to each other in the sub-scanning direction.

DETAILED DESCRIPTION

An image reading apparatus according to an embodiment is described below with reference to FIGS. 1 to 18. A multifunction peripheral 100 is described as an example of the image reading apparatus. The multifunction peripheral 100 may execute a print job and a transmission job based on the image data obtained by reading a document. The multifunction peripheral 100 is also an image forming apparatus. Each element, such as configuration or arrangement, in the description according to the present embodiment does not limit the scope of the disclosure and is merely a descriptive example.

(The Multifunction Peripheral 100)

Figure 1:
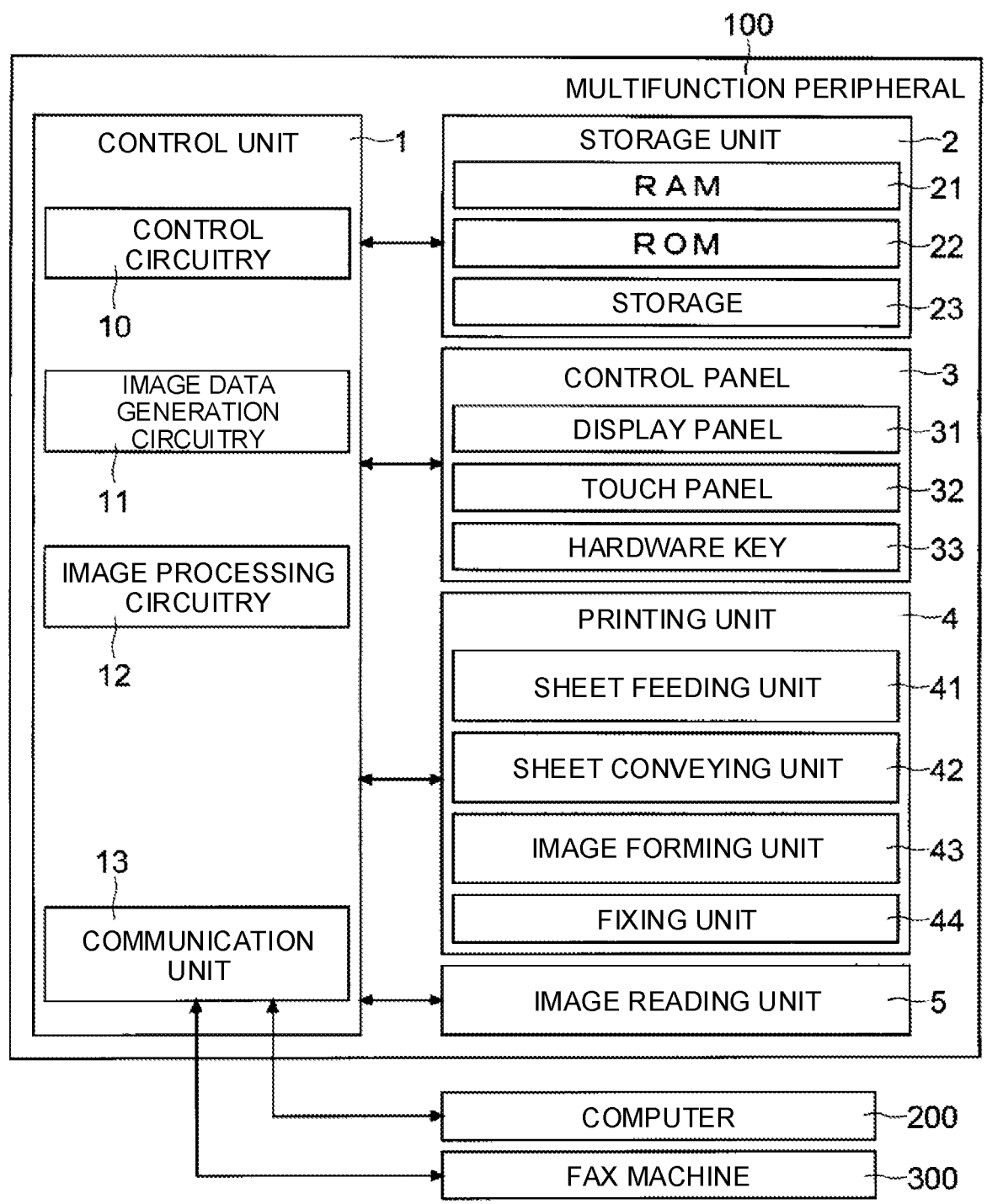
FIG. 1 is a diagram illustrating an example of a multifunction peripheral according to an embodiment.

With reference to FIG. 1, the multifunction peripheral 100 according to the embodiment is described. FIG. 1 is a diagram illustrating an example of the multifunction peripheral 100 according to the embodiment.

As illustrated in FIG. 1, the multifunction peripheral 100 includes a control unit 1, a storage unit 2, a control panel 3, a printing unit 4, and an image reading unit 5.

The control unit 1 controls the operation of the multifunction peripheral 100. The control unit 1 controls the operation of the multifunction peripheral 100 during a job. The control unit 1 includes a control circuitry 10, an image data generation circuitry 11, an image processing circuitry 12, and a communication unit 13. The control circuitry 10 is, for example, a CPU. The control circuitry 10 executes job-related processing and computations. The image data generation circuitry 11 processes an analog image signal output by the image reading unit 5 after reading a document. Further, the image data generation circuitry 11 generates read image data. The image processing circuitry 12 executes image processing on image data used for a job. The image processing circuitry 12 is, for example, an ASIC for image processing.

The storage unit 2 includes a RAM 21 as a volatile storage device. The storage unit 2 includes a ROM 22 and a storage 23 as a nonvolatile storage device. The storage 23 is, for example, an HDD or an SSD. The control unit 1 controls each unit based on programs and data stored in the storage unit 2.

The control panel 3 receives the user's settings. The control panel 3 includes a display panel 31, a touch panel 32, and a hardware key 33. The control unit 1 causes the display panel 31 to display a message or a setting screen. The control unit 1 causes the display panel 31 to display an operation image. The operation image is, for example, a button, a key, or a tab. The control unit 1 recognizes the operated operation image based on an output of the touch panel 32. The hardware key 33 includes a start key and a numeric keypad. The touch panel 32 and the hardware key 33 receive the user's setting operation (job-related operation). For example, the control panel 3 receives the setting for the reading mode of a document. The control unit 1 recognizes the setting details based on an output of the control panel 3.

The printing unit 4 includes a sheet feeding unit 41, a sheet conveying unit 42, an image forming unit 43, and a fixing unit 44. The sheet feeding unit 41 includes a sheet feed cassette and a sheet feed roller. The sheet feed cassette accommodates sheets. The sheet feed roller delivers a sheet. During a print job, the control unit 1 feeds a sheet to the sheet feeding unit 41. The sheet conveying unit 42 includes a pair of conveying rollers and a conveying motor to convey a sheet. The pair of conveying rollers convey a sheet. The conveying motor rotates the pair of conveying rollers. The control unit 1 causes the sheet conveying unit 42 to convey a sheet.

The image forming unit 43 includes, for example, a photosensitive drum, a charging device, an exposure device, a developing device, and a transfer roller. The control unit 1 causes the image forming unit 43 to form a toner image based on image data. The control unit 1 causes the image forming unit 43 to transfer the toner image onto the conveyed sheet. The fixing unit 44 includes a heater, a fixing rotator, and a fixing motor. The heater heats the fixing rotator. The sheet is conveyed in contact with the fixing rotator. Thus, the toner image is fixed to the sheet. The control unit 1 causes the fixing unit 44 to fix the transferred toner image to the sheet. The sheet conveying unit 42 discharges the printed sheet to outside of the apparatus.

The communication unit 13 includes a communication control circuitry, a connector, and a communication memory. The communication memory stores communication software. The communication unit 13 communicates with a computer 200 and a fax machine 300. The computer 200 is, for example, a PC or a server. The communication unit 13 receives print data that is transmitted from the computer 200 or the fax machine 300. The control unit 1 causes the printing unit 4 to execute printing based on the received print data (print job, fax reception printing). Further, in the case of a transmission job, the control panel 3 receives the setting of a destination. The control unit 1 causes the communication unit 13 to transmit, to the set destination, the image file based on the image data obtained by scanning (scan transmission, fax transmission).

(The Image Reading Unit 5)

Figure 2:
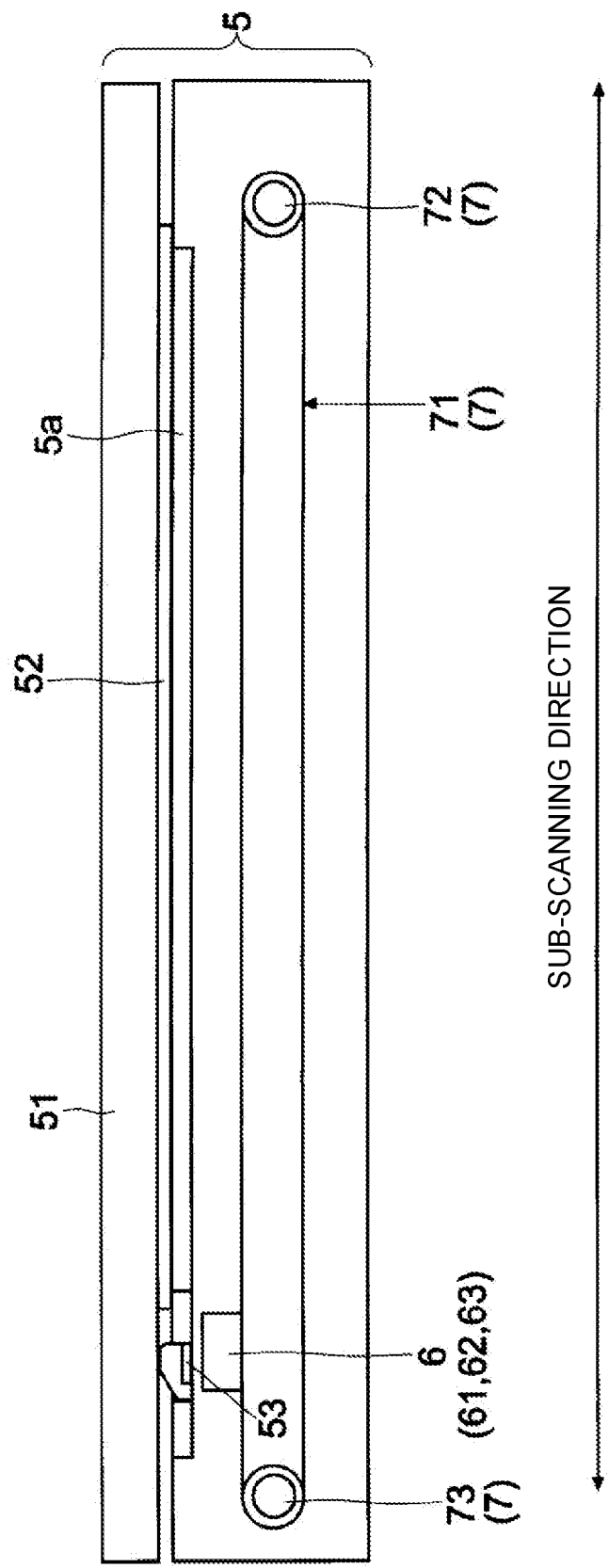
FIG. 2 is a diagram illustrating an example of an image reading unit according to the embodiment.
Figure 3:
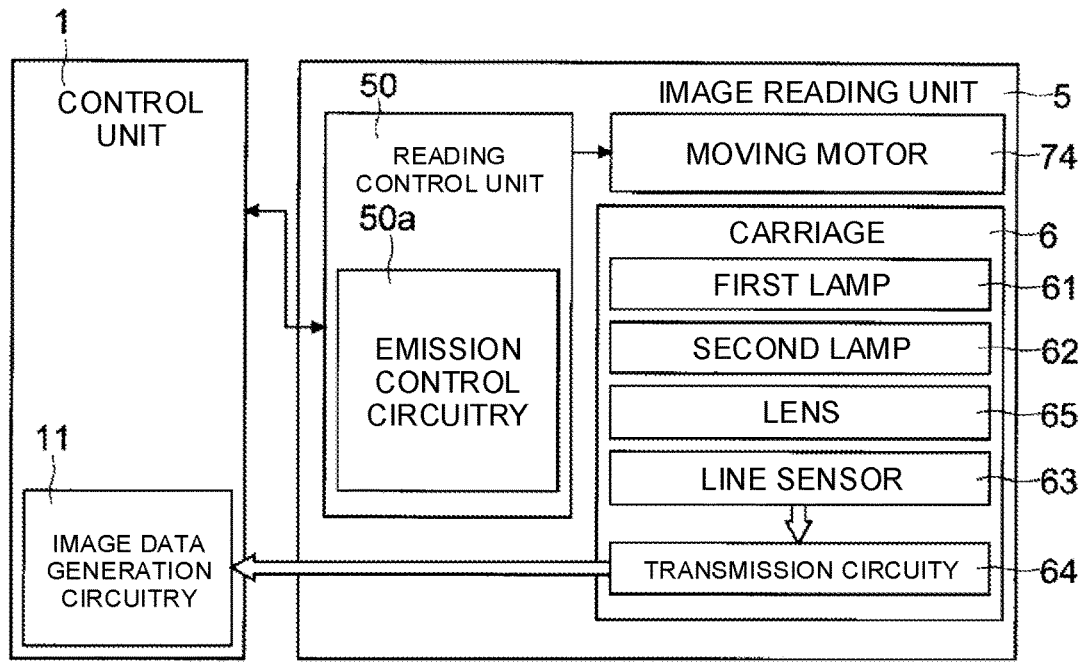
FIG. 3 is a diagram illustrating an example of the image reading unit according to the embodiment.
Figure 4:
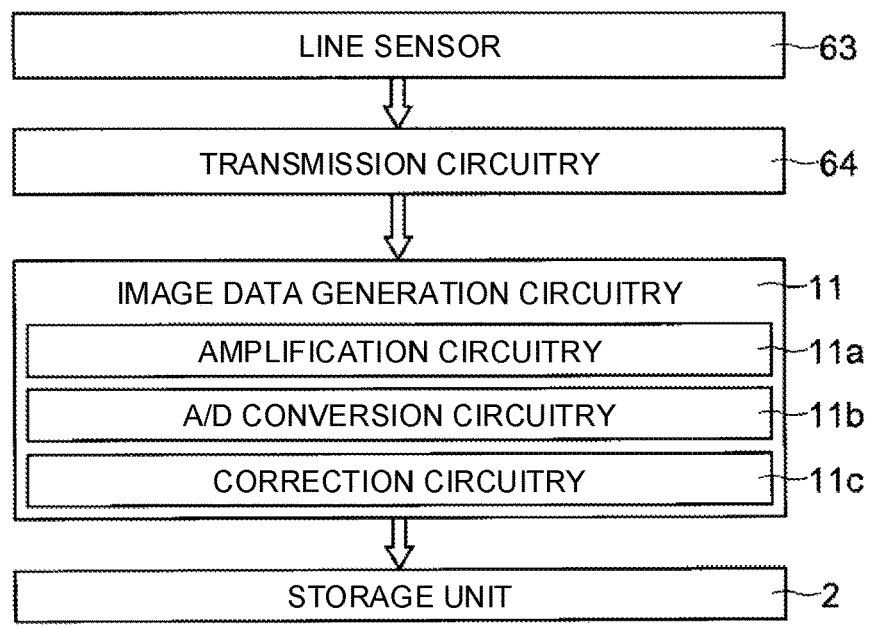
FIG. 4 is a diagram illustrating an example of image data generation in the multifunction peripheral according to the embodiment.

Next, an example of the image reading unit 5 according to the embodiment is described with reference to FIGS. 2 to 4. FIGS. 2 and 3 are diagrams illustrating an example of the image reading unit 5 according to the embodiment. FIG. 2 is a diagram of the image reading unit 5 when viewed from the front side of the multifunction peripheral 100 according to the embodiment. FIG. 4 is a diagram illustrating an example of image data generation in the multifunction peripheral 100 according to the embodiment.

A platen 5a (a table-reading platen glass) is provided on the upper right side of the image reading unit 5. The platen 5a is a transparent plate (glass plate). When table reading is executed, the user sets the document to be read on one surface (the upper surface in FIG. 2) of the platen 5a.

A document pressing unit 51 is provided in the upper portion of the image reading unit 5. The document pressing unit 51 may be opened and closed such that the front side of the multifunction peripheral 100 is swung up and down. The user opens the document pressing unit 51 to set a document. After setting, the user closes the document pressing unit 51. FIG. 2 illustrates the closed state of the document pressing unit 51. A pressing plate 52 is attached to the lower surface of the document pressing unit 51. The pressing plate 52 is, for example, a white plate. The closed pressing plate 52 covers the platen 5a and the set document from above. To prevent the movement of the document, the pressing plate 52 presses the document from above. The document pressing unit 51 functions as a cover that presses the document.

As illustrated in FIG. 3, the image reading unit 5 includes a reading control unit 50. The reading control unit 50 is a board that controls the operation of the image reading unit 5. The reading control unit 50 is a control board including a CPU and a memory. The reading control unit 50 receives a document reading instruction from the control unit 1. The reading control unit 50 controls document reading in response to the instruction.

The image reading unit 5 includes a carriage 6, a white reference plate 53, and a moving mechanism 7. The moving mechanism 7 includes a belt 71, a pulley 72, a pulley 73, and a moving motor 74. The carriage 6 is a CIS scan unit. The image reading unit 5 may include a CCD scan unit.

The belt 71 is endless. The belt 71 extends between the pulley 72 and the pulley 73. The belt 71 is coupled to the carriage 6. The moving motor 74 is provided in the image reading unit 5 (see FIG. 3). The drive of the moving motor 74 is transmitted to the pulley 72 or the pulley 73. The moving motor 74 may rotate in the forward or backward direction. To move the carriage 6, the reading control unit 50 rotates the moving motor 74. Accordingly, the belt 71 revolves. In accordance with the revolution of the belt 71, the carriage 6 is moved in the horizontal direction (the sub-scanning direction, the direction perpendicular to the main scanning direction, the left and right direction in FIG. 2). The carriage 6 is moved on the side of the other surface (the lower surface) of the platen 5a.

The white reference plate 53 is provided on the outer side of the platen 5a in the sub-scanning direction. The longitudinal direction of the white reference plate 53 is the main scanning direction. The home position is set for the carriage 6. The home position is the position where the position of the read line of the carriage 6 (a line sensor 63) is at the white reference plate 53. In FIG. 2, the carriage 6 is located in the home position.

The carriage 6 includes a first lamp 61, a second lamp 62, the line sensor 63, and a transmission circuitry 64. The carriage 6 also includes a lens 65 (rod lens array) that guides reflected light to each light receiving element of the line sensor 63. The first lamp 61 and the second lamp 62 irradiate the reading target (a document, the pressing plate 52, and the white reference plate 53) with light along the main scanning direction.

The reading control unit 50 includes an emission control circuitry 50a. The emission control circuitry 50a controls the emission of the first lamp 61 and the second lamp 62. To read a document, the control unit 1 gives a document reading instruction to the emission control circuitry 50a. In response to the instruction, the emission control circuitry 50a turns on/off the first lamp 61 and the second lamp 62 during document reading.

The line sensor 63 reads the document set on the platen 5a. The line sensor 63 reads the reading target (the document, the pressing plate 52, and the white reference plate 53). For example, there is the single line sensor 63. Furthermore, there may be three line sensors 63 for R, G, and B to read the reading target (document) in color.

The line sensor 63 includes a plurality of light receiving elements (photoelectric conversion elements and pixels). The light receiving element receives the light reflected by the reading target. The light receiving elements are arranged in rows. The direction in which the light receiving elements are arranged is the main scanning direction. Each light receiving element outputs the analog image signal (analog voltage) corresponding to the amount of received light (the amount of reflected light). Each light receiving element outputs a larger analog image signal as the amount of light received during the reading period is larger.

The transmission circuitry 64 is, for example, a shift register. The transmission circuitry 64 extracts the electric charge of each light receiving element stored during the reading period of one line. Then, the transmission circuitry 64 transmits the extracted electric charge as an analog image signal to the image data generation circuitry 11.

The image data generation circuitry 11 is coupled to the transmission circuitry 64 via a cable. The image data generation circuitry 11 executes A/D conversion on the analog image signal output from the line sensor 63 to generate image data. The image data generation circuitry 11 includes a plurality of circuitries. The image data generation circuitry 11 includes, for example, an amplification circuitry 11a, an A/D conversion circuitry 11b, and a correction circuitry 11c. The amplification circuitry 11a amplifies an input analog image signal. The amplified analog image signal is input to the A/D conversion circuitry 11b. The A/D conversion circuitry 11b converts the input analog image signal to a digital image signal to generate image data.

The generated image data is input to the correction circuitry 11c. For example, the correction circuitry 11c includes a shading correction circuitry. The shading correction circuitry performs shading correction. The correction circuitry 11c may include other types of correction circuitries. The image data generated and processed by the image data generation circuitry 11 is stored as read image data in the storage unit 2.

(Movement of the Carriage 6)

Figure 5:
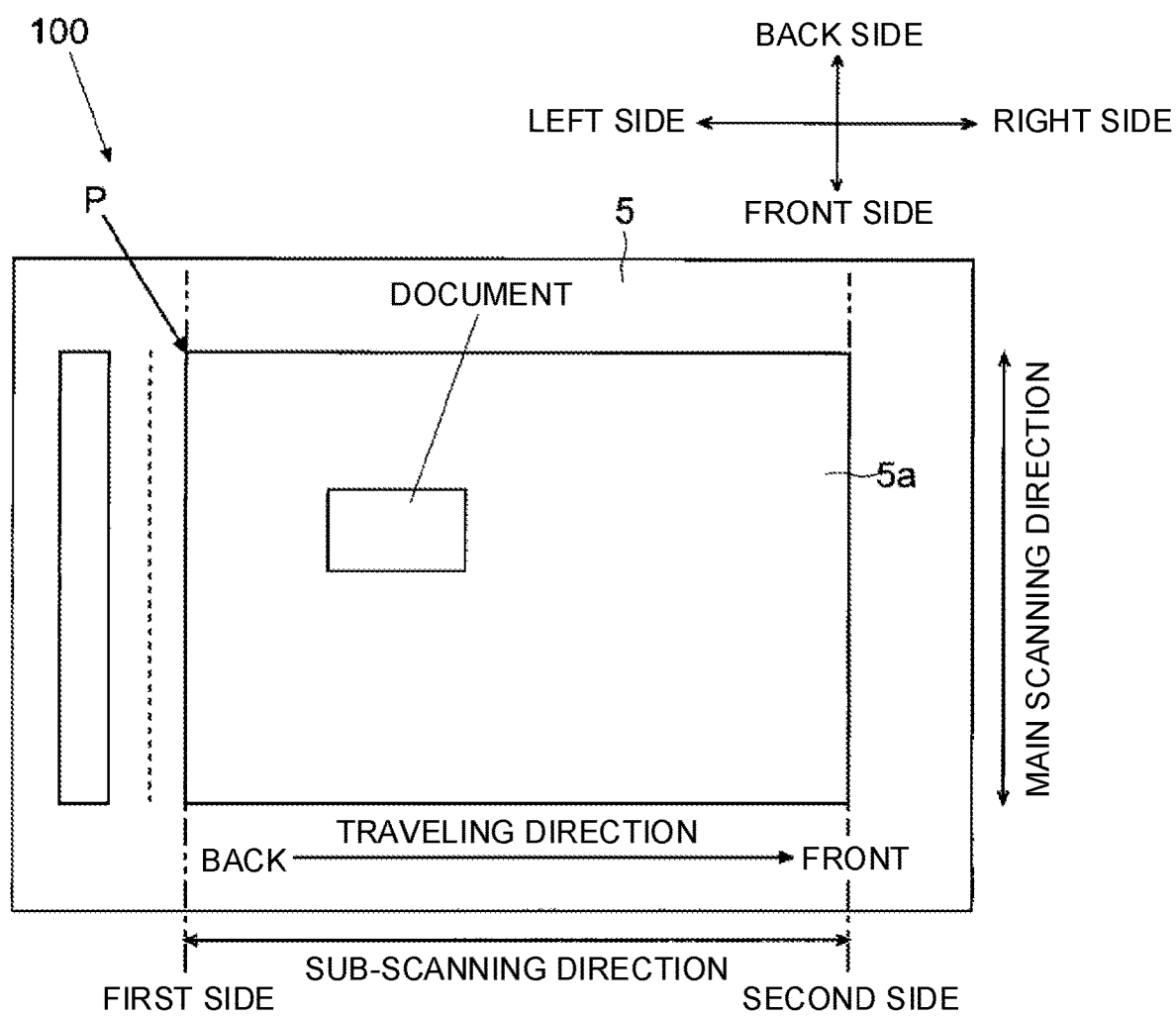
FIG. 5 is a diagram illustrating the movement of a carriage during document reading according to the embodiment.

Next, an example of the movement of the carriage 6 during document reading according to the embodiment is described with reference to FIG. 5. FIG. 5 is a diagram illustrating the movement of the carriage 6 during document reading according to the embodiment. FIG. 5 illustrates an example of the image reading unit 5 when viewed from above. The document pressing unit 51 is not illustrated in FIG. 5.

The user places (sets) the document on the platen 5a. The user sets the reading surface facing downward. FIG. 5 illustrates an example of the state where a small-sized document (special document), such as a business card or a general-purpose card, is set. As illustrated in FIG. 5, a reference point P is set on the platen 5a. The reference point P is the left back corner of the platen 5a when the image reading unit 5 (the multifunction peripheral 100) is viewed from the front side. When the platen 5a is viewed from above, the reference point P is located on the upper left corner of the platen 5a. To place a standard-sized document, the user aligns the upper left corner of the document with the reference point P.

During document reading, the control unit 1 causes the moving mechanism 7 to move the carriage 6 from a side (edge) of the platen 5a on a first side to a side of the platen 5a on a second side. The sides are opposed to each other in the sub-scanning direction. The side closer to the reference point P is a side of the platen 5a on the first side. FIG. 5 illustrates an example of the position of the read line at the home position by a broken line. After moving from the home position, the carriage 6 starts reading from a reading start line on the first side of the platen 5a. The reading start line passes through the reference point P. FIG. 5 illustrates the traveling direction of the carriage 6 during document reading (scanning) by a solid arrow. After the document reading is completed, the control unit 1 causes the moving mechanism 7 to move the carriage 6 toward the home position. The control unit 1 reverses the traveling direction so as to return the carriage 6 to the home position.

The control unit 1 moves the carriage 6 at a specific speed. The moving speed of the carriage 6 is the value obtained by dividing the reading width (one pixel, one dot pitch) of one line by the reading cycle of one line. In other words, the control unit 1 moves the carriage 6 by one dot in each reading cycle of one line.

(The First Lamp 61 and the Second Lamp 62)

Figure 6:
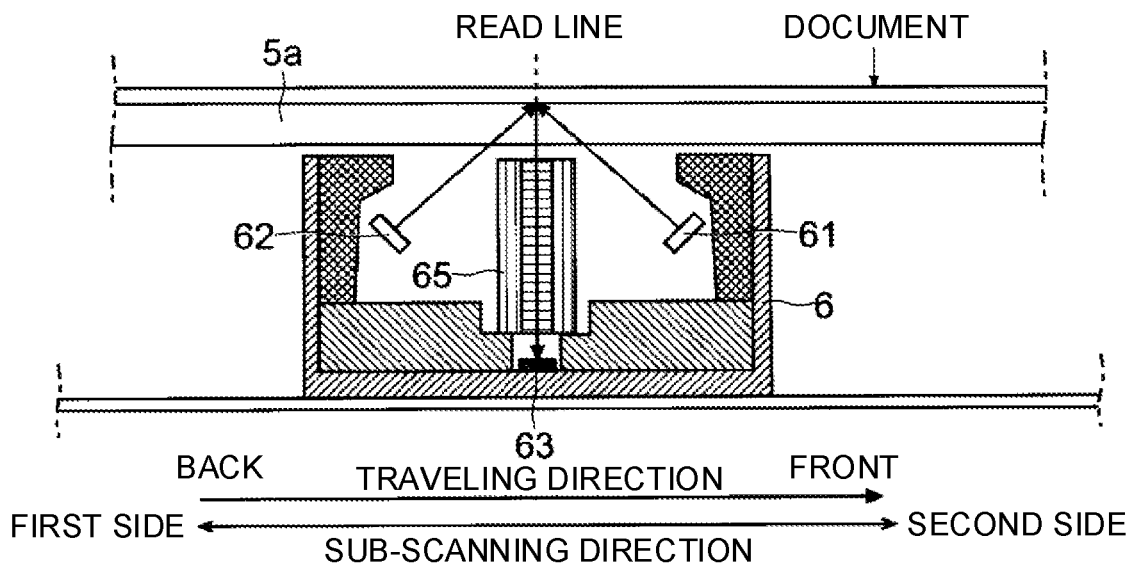
FIG. 6 is a diagram illustrating an example of the carriage according to the embodiment.
Figure 7:
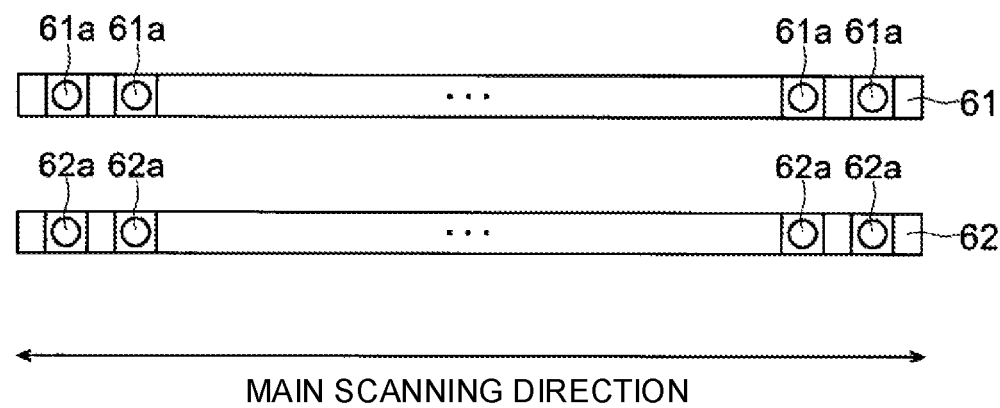
FIG. 7 is a diagram illustrating an example of a first lamp and a second lamp according to the embodiment.

Next, an example of the first lamp 61 and the second lamp 62 according to the embodiment is described with reference to FIGS. 6 and 7. FIG. 6 is a diagram illustrating an example of the carriage 6 according to the embodiment. FIG. 7 is a diagram illustrating an example of the first lamp 61 and the second lamp 62 according to the embodiment.

As illustrated in FIG. 6, the carriage 6 includes the first lamp 61 and the second lamp 62. The first lamp 61 and the second lamp 62 are arranged in the sub-scanning direction. When the first lamp 61 is turned on, the first lamp 61 emits light to the platen 5*a* and the set document along the main scanning direction. Furthermore, when the second lamp 62 is turned on, the second lamp 62 emits light to the platen 5*a* and the set document along the main scanning direction.

As illustrated in FIG. 6, the first lamp 61 is located on the second side in the sub-scanning direction as compared with the second lamp 62. With regard to the traveling direction of the carriage 6, the first lamp 61 is located on the front side as compared with the second lamp 62. Conversely, the second lamp 62 is located on the first side in the sub-scanning direction as compared with the first lamp 61. With regard to the traveling direction of the carriage 6, the second lamp 62 is located on the back side as compared with the first lamp 61.

As illustrated in FIG. 6, the first lamp 61 emits light obliquely upward of the first side (the back side). The second lamp 62 emits light obliquely upward of the second side (the front side). The lens 65 (rod lens array) is provided between the first lamp 61 and the second lamp 62. The line sensor 63 is provided under the lens 65. The position of the read line in the sub-scanning direction is between the first lamp 61 and the second lamp 62.

As illustrated in FIG. 7, the longitudinal direction of the first lamp 61 is in the main scanning direction so as to emit light along the main scanning direction. The first lamp 61 includes a plurality of first light sources 61*a*. The first light sources 61*a* are, for example, white LEDs. The first light sources 61*a* may include, for example, LEDs in three colors of R, G, and B. In this case, due to the simultaneous emission of R, G, and B, the first light sources 61*a* may be used as a white light source. The first light sources 61*a* are arranged along the main scanning direction. To read a document, the control unit 1 causes the emission control circuitry 50*a* to turn on each of the first light sources 61*a*.

Further, as illustrated in FIG. 7, the longitudinal direction of the second lamp 62 is also in the main scanning direction so as to emit light along the main scanning direction. The second lamp 62 includes a plurality of second light sources 62*a*. The second light sources 62*a* are also, for example, white LEDs. The second light sources 62*a* are arranged along the main scanning direction. To read a document, the control unit 1 causes the emission control circuitry 50*a* to turn on each of the second light sources 62*a*.

(Document Reading)

Figure 8:
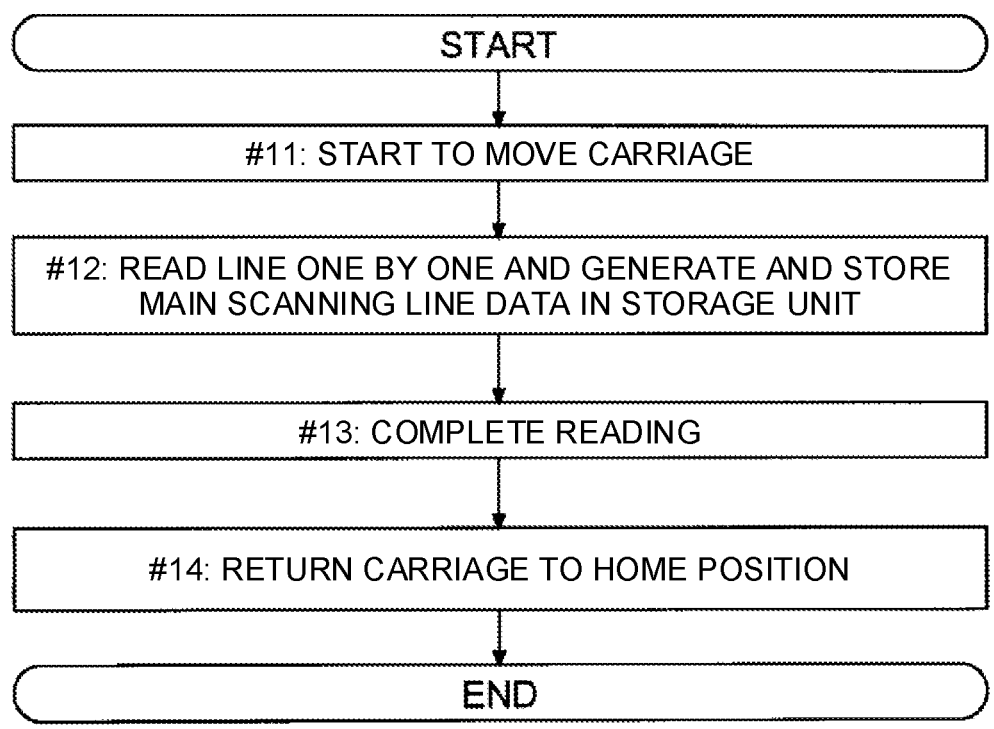
FIG. 8 is a diagram illustrating an example of the flow of a process in a card scan mode according to the embodiment.
Figure 9:
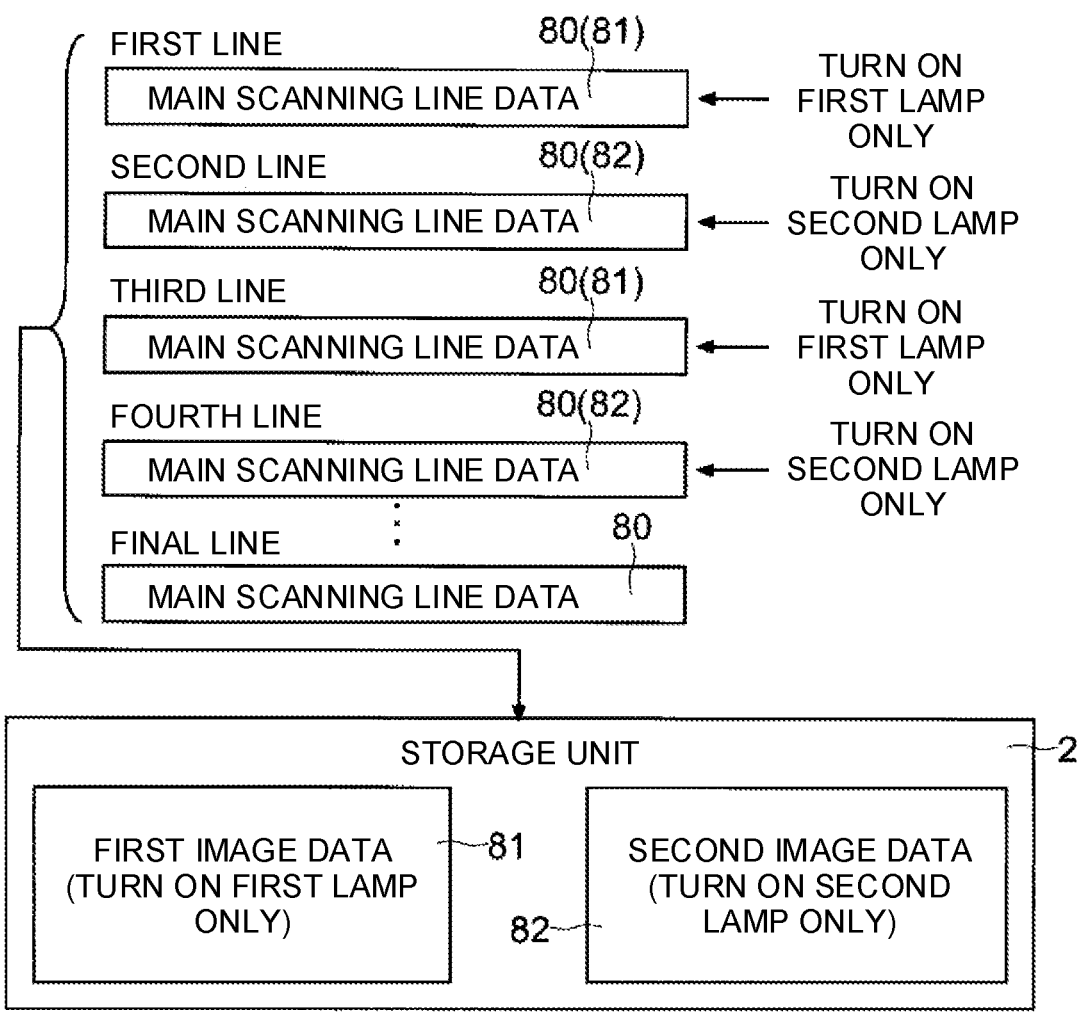
FIG. 9 is a diagram illustrating an example of the flow of a process in the card scan mode according to the embodiment.

Next, with reference to FIGS. 8 and 9, an example of the flow of reading in a card scan mode with the multifunction peripheral 100 according to the embodiment is described. FIGS. 8 and 9 are diagrams illustrating an example of the flow of a process in the card scan mode according to the embodiment.

The multifunction peripheral 100 is provided with the card scan mode as one of the modes for reading a document. The card scan mode may be selected by using the control panel 3. Jobs such as printing, transmission, or storage, may be performed based on the image data obtained in the card scan mode.

The card scan mode is a mode for reading a document having a special size, such as a license, an ID card, a passport, or a business card. It can be said that the card scan mode is a mode for reading a document having an indefinite size. In the card scan mode, the process to recognize the edge of a document and the process to adjust the tilt of a document portion D2 included in the image data are automatically performed.

In the card scan mode, the control unit 1 executes reading in a specific reading range (card reading range) of the platen 5*a*. The length of the card reading range in the sub-scanning direction is previously defined. For example, the length of the card reading range in the sub-scanning direction is the length of an A4 short side (an A5 long side). For this reason, the user sets a document within the range from the reference point P to the length of the A4 short side on the platen 5*a* in the sub-scanning direction.

When the card scan mode is not selected, the control unit 1 does not perform the document edge recognition process or the tilt adjustment process. The control unit 1 executes reading within the range set on the control panel 3. For example, when A3 is set as the reading size, the control unit 1 causes the image reading unit 5 to read the A3 size range of the platen 5*a*.

The start in FIG. 8 is the time when the reading of a document in the card scan mode is started. For example, when the user selects the card scan mode, the control unit 1 causes the display panel 31 to display the guidance for the card scan mode. The user sets the document (card) on the platen 5*a* in accordance with the guidance. After setting, the user closes the document pressing unit 51. Further, when the control panel 3 receives the start of scanning, the reading of the document in the card scan mode is started.

First, the control unit 1 causes the image reading unit 5 to start to move the carriage 6 (Step #11). Then, while the control unit 1 causes the image reading unit 5 to read a line one by one, the control unit 1 generates the image data (main scanning line data 80) on each line based on the analog image signal output from the line sensor 63 and causes the storage unit 2 to store each set of the generated main scanning line data 80 (Step #12).

Specifically, the image reading unit 5 (the line sensor 63) starts to read from the reading start line. The distance from the home position to the reading start line is previously defined. When the carriage 6 has moved for the distance from the home position to the reading start line, the reading control unit 50 causes the line sensor 63 to read a first line.

With reference to FIG. 9, an example of the emission of the lamps during the reading of each line in the card scan mode is described. First, in the case of the card scan mode, the control unit 1 turns on any one of the first lamp 61 and the second lamp 62 during the reading of one line.

For example, the control unit 1 turns on only the first lamp 61 (each of the first light sources 61*a*) during the reading of an odd-numbered line. The control unit 1 turns on only the second lamp 62 (each of the second light sources 62*a*) during the reading of an even-numbered line. As illustrated in FIG. 9, the control unit 1 turns on only the first lamp 61 during the reading of the first line (the initial line or the reading start line). For the subsequent line, the control unit 1 turns on only the second lamp 62. In this manner, in a case where the first lamp 61 is turned on to read one line, the control unit 1 turns on the second lamp 62 during the reading of the subsequent line. In a case where the second lamp 62 is turned on to read one line, the control unit 1 turns on the first lamp 61 during the reading of the subsequent line. The control unit 1 alternately turns on the first lamp 61 and the second lamp 62 so as to read each line.

The control unit 1 may turn on only the second lamp 62 during the reading of an odd-numbered line. In this case, the control unit 1 turns on only the first lamp 61 during the reading of an even-numbered line.

During the reading period of one line, the control unit 1 stores the line image data (the main scanning line data 80), which is obtained when the first lamp 61 is turned on, as first image data 81 in the storage unit 2 (the RAM 21). During the reading period of one line, the control unit 1 stores the line image data (the main scanning line data 80), which is obtained when the second lamp 62 is turned on, as second image data 82 in the storage unit 2 (the RAM 21).

Accordingly, the reading of the card reading range is completed (Step #13). Afterward, the control unit 1 returns (moves) the carriage 6 to the home position (Step #14). Then, the control unit 1 ends the process. On the backward path (return path) of the carriage 6, the control unit 1 refrains from turning on the first lamp 61 and the second lamp 62. Furthermore, on the backward path (return path) of the carriage 6, the control unit 1 prevents the line sensor 63 from reading. Even in the card scan mode, the reading corresponding to only one surface of a document is executed.

(Recognition of the Position of an Edge of the Document)

Figure 10:
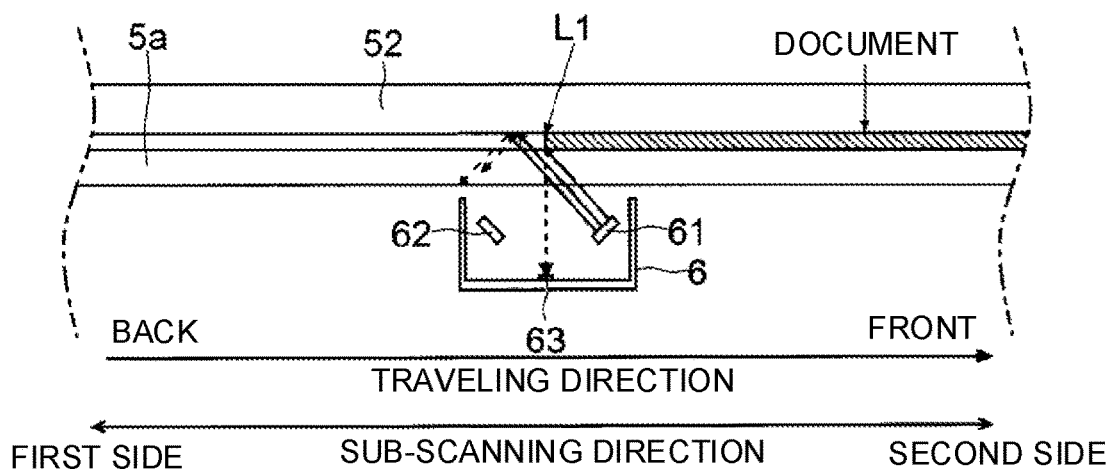
FIG. 10 is a diagram illustrating an example of a process using first image data according to the embodiment.
Figure 11:
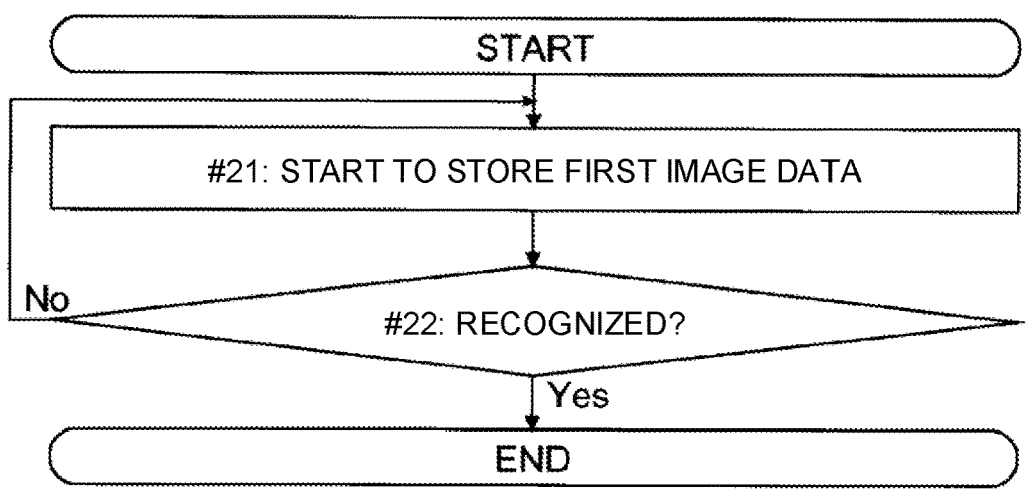
FIG. 11 is a diagram illustrating an example of the process using the first image data according to the embodiment.
Figure 12:
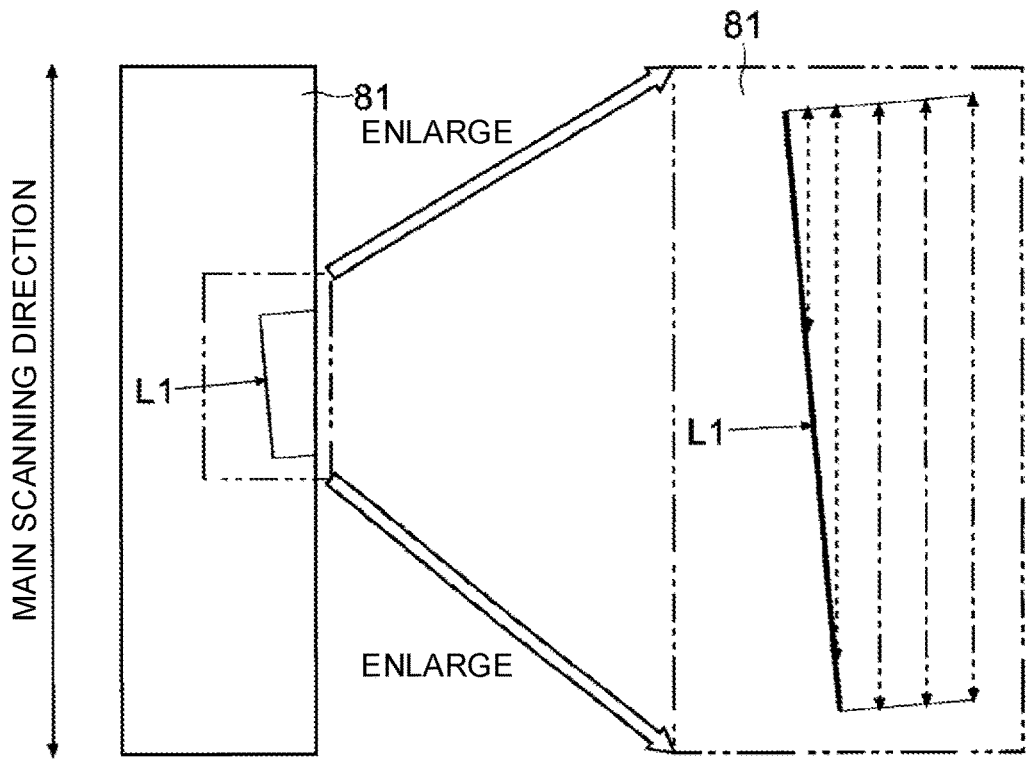
FIG. 12 is a diagram illustrating an example of the process using the first image data according to the embodiment.
Figure 13:
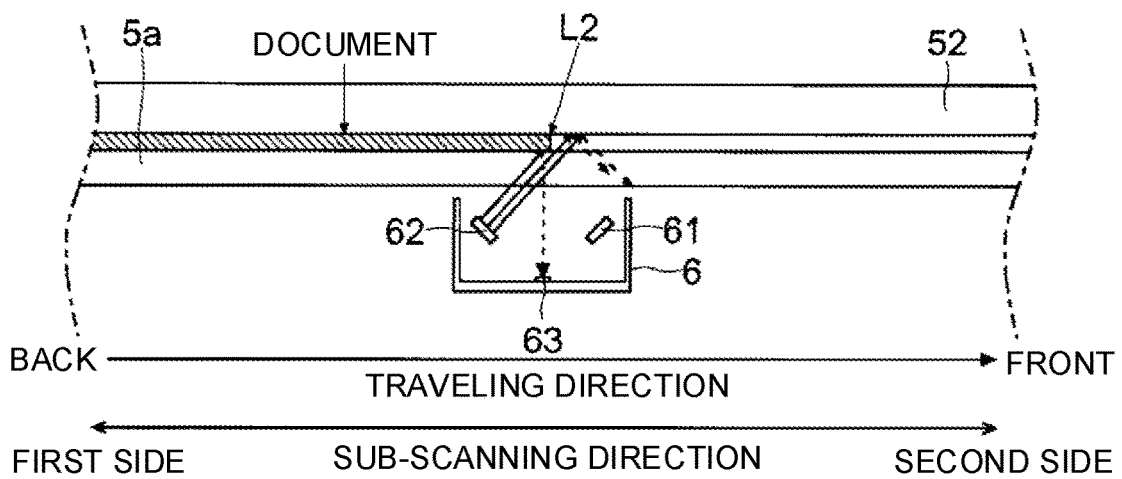
FIG. 13 is a diagram illustrating an example of a process using second image data according to the embodiment.
Figure 14:
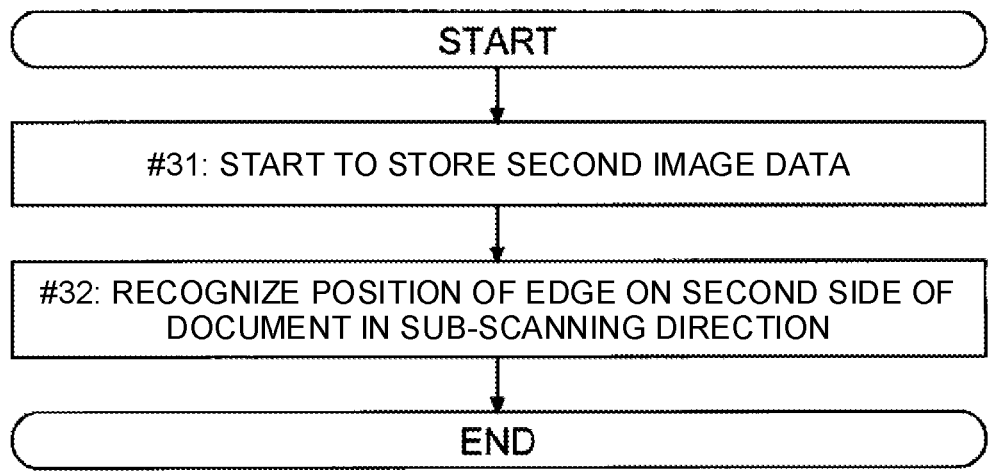
FIG. 14 is a diagram illustrating an example of the process using the second image data according to the embodiment.
Figure 15:
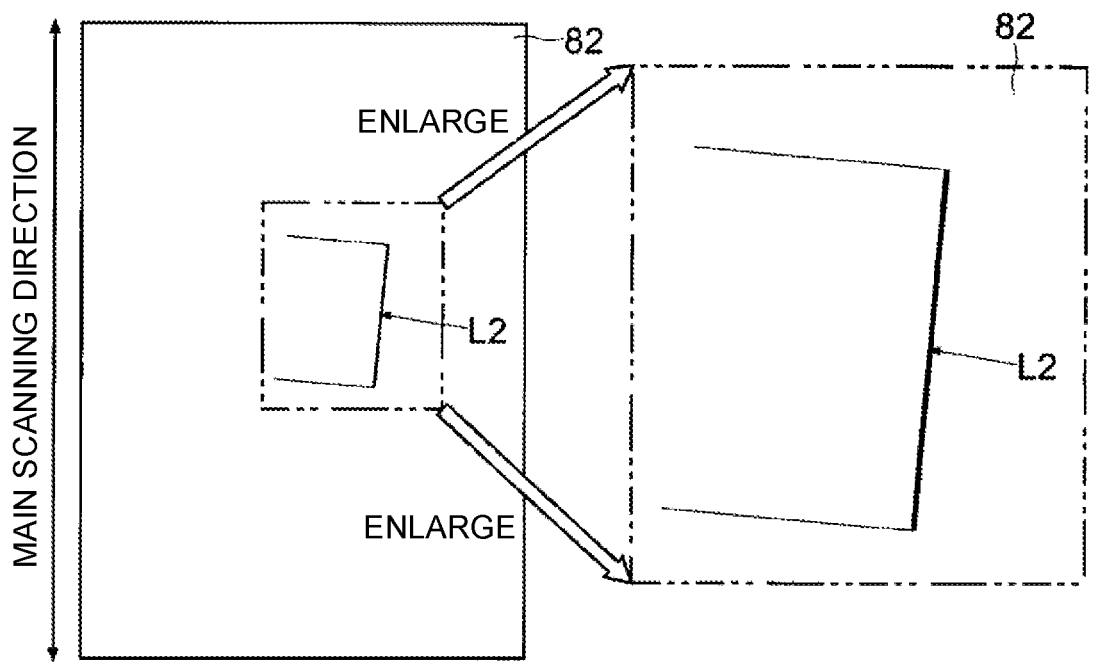
FIG. 15 is a diagram illustrating an example of the process using the second image data according to the embodiment.

Next, an example of the process to recognize the position of an edge of a document in the multifunction peripheral 100 according to the embodiment is described with reference to FIGS. 10 to 15. FIGS. 10 to 12 are diagrams illustrating an example of the process using the first image data 81 according to the embodiment. FIGS. 13-15 are diagrams illustrating an example of the process using the second image data 82 according to the embodiment.

In the card scan mode, a small-sized document is set. Typically, the document is set on the platen 5a with a slight misalignment. The edges of the document are slightly tilted with respect to the main scanning direction and the sub-scanning direction. The control unit 1 recognizes the position of a first-side edge L1 and a second-side edge L2 of the document. The tilt is corrected based on a recognition result.

The first-side edge L1 is an edge on the first side out of the document edges opposed to each other in the sub-scanning direction. The first-side edge L1 is the edge closer to the home position in the sub-scanning direction. In terms of the reading order, the first-side edge L1 is the edge of the first portion to be read (the leading portion of the document). In terms of the traveling direction of the carriage 6, the first-side edge L1 is the edge on the back side.

The second-side edge L2 is the edge on the second side out of the document edges opposed to each other in the sub-scanning direction. The second-side edge L2 is the edge farther from the home position in the sub-scanning direction. In terms of the reading order, the second-side edge L2 is the edge of the last portion to be read (the trailing edge of the document). In terms of the traveling direction of the carriage 6, the second-side edge L2 is the edge on the front side.

Considering that the document is set at a tilt, the first-side edge L1 is the straight line that forms an edge of the document and that is on the first side in the sub-scanning direction out of the edges opposed to each other in the sub-scanning direction when the tilt is corrected. In terms of the tilted state, it can be said that the first-side edge L1 is a straight line on the first side in the sub-scanning direction out of the two straight lines having more main scanning direction components than sub-scanning direction components. The second-side edge L2 is the straight line that forms an edge of the document and that is on the second side in the sub-scanning direction out of the edges opposed to each other in the sub-scanning direction when the tilt is corrected. In terms of the tilted state, it can be said that the second-side edge L2 is a straight line on the second side in the sub-scanning direction out of the two straight lines having more main scanning direction components than sub-scanning direction components.

(1) Recognition of the Position of the First-Side Edge L1

First, an example of the recognition of the position of the first-side edge L1 is described. To recognize the position of the first-side edge L1, the control unit 1 uses the first image data 81. The first image data 81 is the image data obtained when only the first lamp 61 (the lamp on the second side with respect to the read line) is turned on. When only the first lamp 61 is turned on, a shadow appears at the first-side edge L1. In the first image data 81, the first-side edge L1 is emphasized, and the pixels corresponding to the first-side edge L1 (the pixels that have read the first-side edge L1) have a high density. In the first image data 81, the first-side edge L1 appears clearly. The control unit 1 uses the first image data 81 to recognize the position of the first-side edge L1.

FIG. 10 illustrates a state where the document is set on the upper side of the platen 5a and the document pressing unit 51 (the pressing plate 52) is closed. The part illustrating the document is hatched. In FIG. 10, the position of the read line of the carriage 6 (the line sensor 63) is near the first-side edge L1 of the document. As illustrated in FIG. 10, a shadow appears at the first-side edge L1 due to the thickness (difference in level) of the document. Further, the reflection of light from the first lamp 61 is disturbed. A lower amount of light is reflected by the document and incident on the line sensor 63 after light is emitted from the first lamp 61. Therefore, it is considered that, in the first image data 81, the pixels corresponding to the first-side edge L1 have a high density. When both the first lamp 61 and the second lamp 62 are turned on, the first-side edge L1 is sometimes unreadable.

An example of the recognition of the position of the first-side edge L1 (the leading portion of the document) is described with reference to FIGS. 11 and 12. The start in FIG. 11 is the time when the generation of the main scanning line data 80 is started in response to the start of reading of the document. The control unit 1 starts to store the first image data 81 (Step #21). When the new main scanning line data 80 is obtained while only the first lamp 61 is turned on, the control unit 1 (the image data generation circuitry 11) adds the new main scanning line data 80 to the first image data 81. Each time the new main scanning line data 80 is obtained while only the first lamp 61 is turned on, the control unit 1 arranges the main scanning line data 80 in the reading order and updates the first image data 81.

The control unit 1 (the image processing circuitry 12) continuously determines whether the position of the first-side edge L1 has been recognized (Step #22, proceeds to Step #21 when No at Step #22). When it is determined that the position of the first-side edge L1 has been recognized (Yes at Step #22), the control unit 1 terminates (ends) the process (the flowchart).

Next, an example of the algorithm for recognizing the position of the first-side edge L1 is described with reference to FIG. 12. FIG. 12 illustrates an example of the first image data 81 during the reading (before the completion of reading of the range). Further, FIG. 12 illustrates an example of the first image data 81 obtained when the document slightly tilted with respect to the main scanning direction and the sub-scanning direction is read. As illustrated in FIG. 12, in the first image data 81, the pixels corresponding to the first-side edge L1 have a high density. Further, as illustrated in FIG. 12, the shadow at another side connected to the first-side edge L1 is also read.

The control unit 1 (the image processing circuitry 12) recognizes a high-density pixel in each line (in each set of the main scanning line data 80) in the main scanning direction with regard to the first image data 81. The control unit 1 recognizes a pixel having a pixel value higher than a specific threshold as a high-density pixel. Then, in the main scanning line data 80 including two or more high-density pixels, the control unit 1 recognizes the width (the number of dots) between a high-density pixel at the end on one side and a high-density pixel at the end on the other side in the main scanning direction. The high-density pixel at the extreme end in the main scanning direction represents the edge of the document. Hereinafter, the width of high-density pixels at the two ends in the main scanning direction is referred to as "two-ends width".

As illustrated in FIG. 12, the two-ends width gradually increases while the first-side edge L1 is read (an example of the two-ends width is illustrated by a dashed arrow). After the reading of the first-side edge L1 in the sub-scanning direction is finished, the two-ends width is continuously constant or almost constant for a period (an example of the two-ends width is illustrated by a chain double-dashed arrow).

For each set of the main scanning line data 80, the control unit 1 obtains the amount of change in the two-ends width between the adjacent sets of the main scanning line data 80 with regard to the single-emission image data. When the absolute value of the amount of change is continuously less than a specific value for a certain period after two or more high-density pixels are recognized in the main scanning line data 80, the control unit 1 determines that the reading of the first-side edge L1 is complete. The certain period is, for example, the time it takes to read lines corresponding to several millimeters to several centimeters in the sub-scanning direction. When it is determined that the reading of the first-side edge L1 is complete, the control unit 1 detects the straight line that is present in the first image data 81 at the current time (the time of determination). The control unit 1 detects the straight line indicating the edge of the document during the reading. For example, the control unit 1 performs Hough transform processing to detect the straight line.

For example, the control unit 1 recognizes that the straight line having the largest absolute value of the tilt of the straight line is the first-side edge L1. The control unit 1 may recognize that the longest straight line is the first-side edge L1. Thus, the control unit 1 may recognize the line in which the pixel indicating the first-side edge L1 is present in the main scanning direction. Further, the control unit 1 may recognize the line in which the pixel indicating the first-side edge L1 is present in the sub-scanning direction. That is, the control unit 1 may recognize the coordinates of each pixel forming the first-side edge L1. The two ends of the first-side edge L1 indicate the corners of the document. The control unit 1 may recognize the positions (coordinates) of the pixels at the two ends of the first-side edge L1.

(2) Recognition of the Position of the Second-Side Edge L2 of the Document

Next, an example of recognition of the position of the second-side edge L2 is described. To recognize the position of the second-side edge L2, the control unit 1 uses the second image data 82. The second image data 82 is the image data obtained when only the second lamp 62 (the lamp on the first side with respect to the read line) is turned on. When only the second lamp 62 is turned on, a shadow appears at the second-side edge L2. In the second image data 82, the second-side edge L2 is emphasized, and the pixels corresponding to the second-side edge L2 (the pixels that have read the second-side edge L2) have a high density. In the second image data 82, the second-side edge L2 appears clearly. The control unit 1 uses the second image data 82 to recognize the position of the second-side edge L2.

FIG. 13 illustrates a state where the document is set on the upper side of the platen 5a and the document pressing unit 51 (the pressing plate 52) is closed. The part illustrating the document is hatched. In FIG. 13, the position of the read line of the carriage 6 (the line sensor 63) is near the second-side edge L2. As illustrated in FIG. 13, a shadow appears at the second-side edge L2 due to the thickness (difference in level) of the document. Further, the reflection of light from the second lamp 62 is disturbed. A lower amount of light is reflected by the document and incident on the line sensor 63 after light is emitted from the second lamp 62. Therefore, it is considered that, in the second image data 82, the pixels corresponding to the second-side edge L2 have a high density. When both the first lamp 61 and the second lamp 62 are turned on, the second-side edge L2 is sometimes unreadable.

An example of the recognition of the position of the second-side edge L2 (the leading portion of the document) is described with reference to FIGS. 14 and 15. The start in FIG. 14 is the time when the generation of the main scanning line data 80 is started in response to the start of reading of the document. The control unit 1 starts to store the second image data 82 (Step #31). When the new main scanning line data 80 is obtained while only the second lamp 62 is turned on, the control unit 1 (the image data generation circuitry 11) adds the new main scanning line data 80 to the second image data 82. Each time the new main scanning line data 80 is obtained while only the second lamp 62 is turned on, the control unit 1 arranges the main scanning line data 80 in the reading order and updates the second image data 82.

When the reading of the document is complete, the control unit 1 (the image processing circuitry 12) recognizes the position of the second-side edge L2 (Step #32). With reference to FIG. 15, an example of the algorithm for recognizing the position of the second-side edge L2 is described. FIG. 15 illustrates an example of the second image data 82. Further, FIG. 15 illustrates an example of the second image data 82 obtained when the document slightly tilted with respect to the main scanning direction and the sub-scanning direction is read. As illustrated in FIG. 15, in the second image data 82, the pixels corresponding to the second-side edge L2 have a high density. Further, as illustrated in FIG. 15, the shadow at another side connected to the second-side edge L2 is also read.

The control unit 1 (the image processing circuitry 12) detects the straight line that is present in the second image data 82. That is, the control unit 1 detects the straight line indicating an edge of the document. For example, the control unit 1 performs Hough transform processing to detect a straight line. For example, the control unit 1 recognizes that, among the detected straight lines, the straight line having the tilt most similar to that of the first-side edge L1 is the second-side edge L2 of the document in the sub-scanning direction.

The control unit 1 (the image processing circuitry 12) may recognize the line in which the pixel indicating the second-side edge L2 is present in the main scanning direction. Further, the control unit 1 may recognize the line in which the pixel indicating the second-side edge L2 is present in the sub-scanning direction. That is, the control unit 1 may recognize the coordinates of each pixel forming the second-side edge L2. The two ends of the second-side edge L2 indicate the corners of the document. The control unit 1 may recognize the positions (coordinates) of the pixels at the two ends of the second-side edge L2.

(Generation of Job Read Image Data 9)

Figure 16:
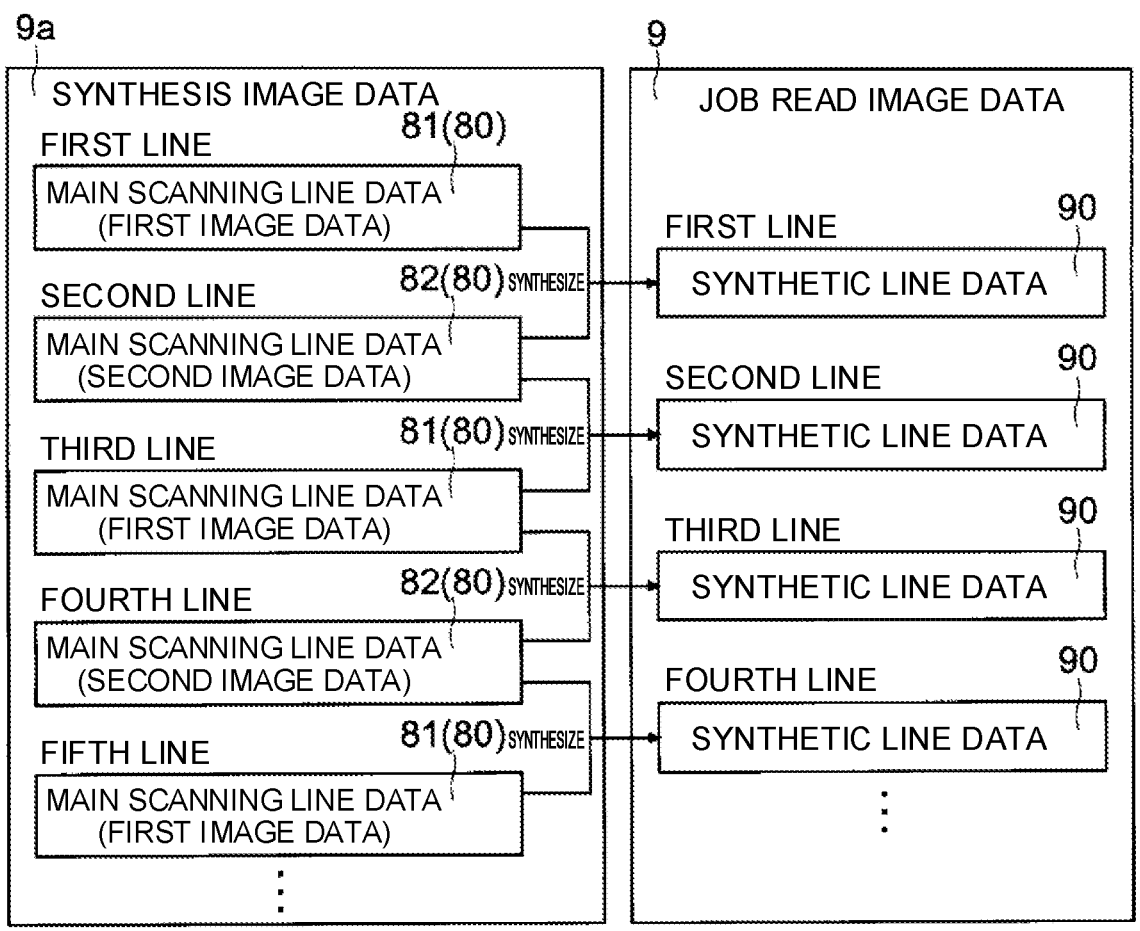
FIG. 16 is a diagram illustrating an example of generation of job read image data according to the embodiment.
Figure 17:
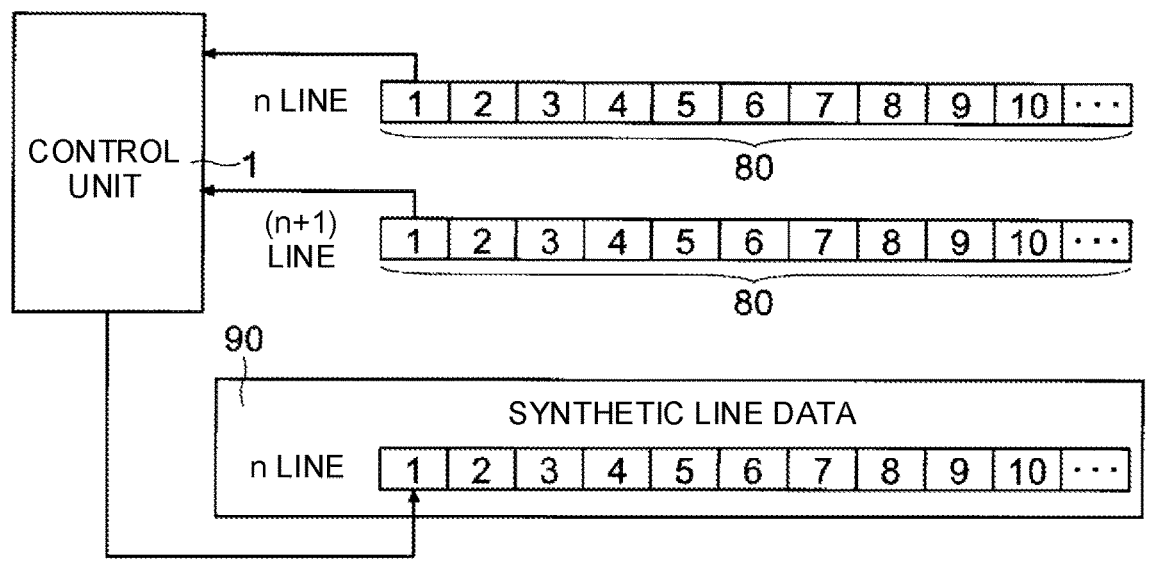
FIG. 17 is a diagram illustrating an example of the generation of the job read image data according to the embodiment.

Next, an example of the generation of the job read image data 9 in the multifunction peripheral 100 according to the embodiment is described with reference to FIG. 16. FIGS. 16 and 17 are diagrams illustrating an example of the generation of the job read image data 9 in the multifunction peripheral 100 according to the embodiment.

The job read image data 9 is the image data used for a job after reading in the card scan mode. In the multifunction peripheral 100, a print job may be executed based on the job read image data 9 obtained in the card scan mode. A transmission job and a storage job may be also executed. The control panel 3 receives the selection of the type of job to be executed. To execute a transmission job, the control panel 3 receives the setting of the destination (transmission destination address) of the job read image data 9. The control unit 1 causes the communication unit 13 to transmit the image file based on the job read image data 9 to the set destination. To execute a storage job, the control panel 3 receives the setting of the storage location of the job read image data 9. The control unit 1 stores the image file based on the job read image data 9 in the set storage location (designated folder).

The control unit 1 (the image processing circuitry 12) synthesizes the first image data 81 and the second image data 82 to generate the job read image data 9, which is the image data used for a job. The generation of the job read image data 9 is described with reference to FIGS. 16 and 17. To generate the job read image data 9, the control unit 1 (the image processing circuitry 12) generates synthesis image data 9a. The control unit 1 generates, as the synthesis image data 9a, the image data in which the main scanning line data 80 are arranged in the reading order. Each time the new main scanning line data 80 is generated, the control unit 1 adds the main scanning line data 80 to the synthesis image data 9a. When the main scanning line data 80 are arranged, the synthesis image data 9a is the image data in which the first image data 81 and the second image data 82 are decomposed and the main scanning line data 80 are arranged in the reading order. The block on the left side of FIG. 16 illustrates a state where the main scanning line data 80 are arranged in the reading order.

The control unit 1 (the image processing circuitry 12) synthesizes the n-th main scanning line data 80 and the (n+1)-th main scanning line data 80 out of the alternately arranged main scanning line data 80 to generate n-th synthetic line data 90. Here, n is a positive integer. The initial value of n is 1. The maximum value of n is the number obtained by subtracting one from the number of read lines. Each time one line is synthesized, the control unit 1 adds 1 to n. The control unit 1 repeatedly generates the synthetic line data 90 for all the alternately arranged main scanning line data 80. The control unit 1 (the image processing circuitry 12) arranges the synthetic line data 90 in the order of generation. The control unit 1 uses the image data in which the synthetic line data 90 are arranged in order as the job read image data 9.

The synthesis of the main scanning line data 80 is described with reference to FIG. 17. To generate the synthetic line data 90, the control unit 1 (the image processing circuitry 12) reads the pixel values of the pixels at the identical position in the main scanning direction in the main scanning line data 80 on two lines. FIG. 17 illustrates a state where the pixel value of a first pixel in an n-th line and the pixel value of a first pixel in an (n+1)-th line are read.

The control unit 1 (the image processing circuitry 12) obtains the average value of the two read pixel values. The control unit 1 averages the pixel values of the pixels at the identical position in the main scanning direction. The control unit 1 uses the obtained average value as the pixel value of each pixel of the synthetic line data 90. In summary, the control unit 1 obtains the average of the pixel value of an m-th pixel in the main scanning direction in the n-th main scanning line data 80 and the pixel value of an m-th pixel in the main scanning direction in the (n+1)-th main scanning line data 80. The control unit 1 sets the obtained average value as the pixel value of an m-th pixel in the n-th synthetic line data 90. Here, m is an integer that is 1 or more. The maximum value of m is the number of dots in the main scanning direction.

(Correction of Tilt)

Figure 18:
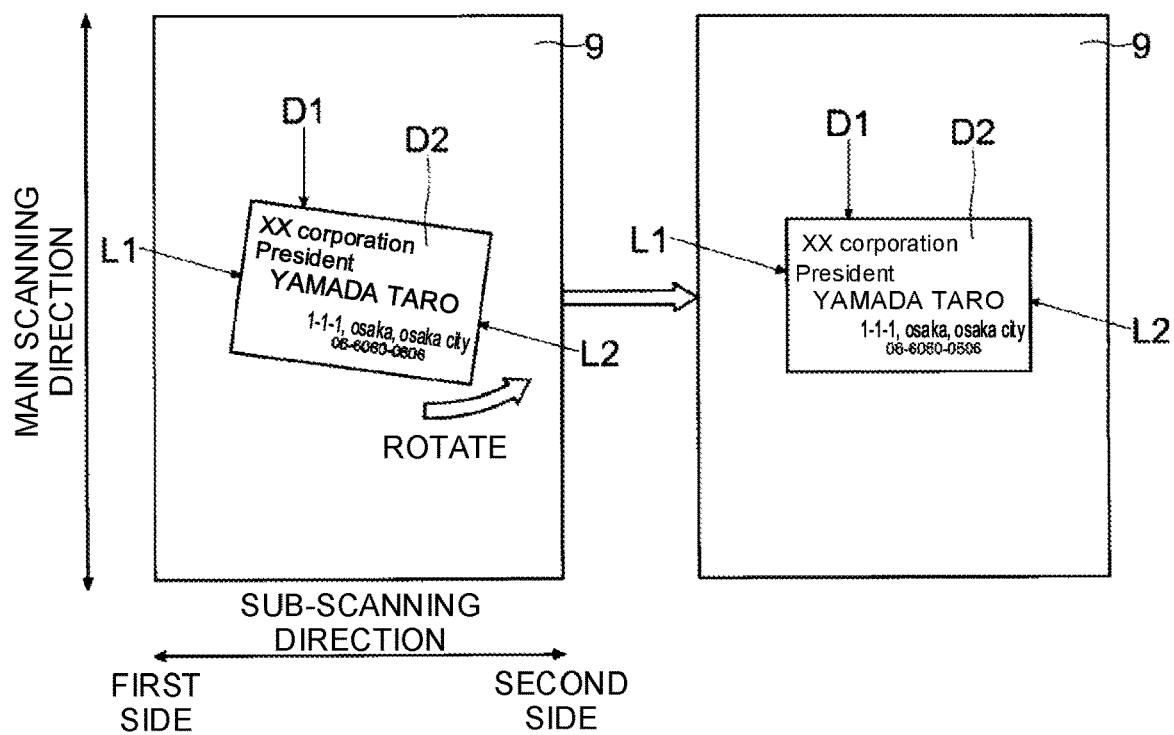
FIG. 18 is a diagram illustrating an example of tilt correction on the job read image data according to the embodiment.

Next, an example of the tilt correction on the job read image data 9 according to the embodiment is described with reference to FIG. 18. FIG. 18 is a diagram illustrating an example of the tilt correction on the job read image data 9 according to the embodiment.

The control unit 1 (the image processing circuitry 12) performs a tilt correction process on the generated job read image data 9. During the tilt correction process, the control unit 1 first recognizes an edge portion D1 of the document in the job read image data 9. The control unit 1 recognizes the positions of the pixels at both ends of the first-side edge L1. The control unit 1 recognizes a pixel on the straight line connecting the pixels at both ends as the edge portion D1 of the document. Furthermore, the control unit 1 recognizes the positions of the pixels at both ends of the second-side edge L2. The control unit 1 also recognizes a pixel on the straight line connecting the pixels at both ends as the edge portion D1 of the document.

The control unit 1 (the image processing circuitry 12) recognizes a pixel on the straight line connecting the top pixel of the first-side edge L1 and the top pixel of the second-side edge L2 as the edge portion D1 of the document. Further, the control unit 1 (the image processing circuitry 12) recognizes a pixel on the straight line connecting the bottom pixel of the first-side edge L1 and the bottom pixel of the second-side edge L2 as the edge portion D1 of the document. The above process allows the control unit 1 to recognize the square (rectangular) frame line as the edge portion D1 of the document.

The control unit 1 (the image processing circuitry 12) crops (cuts out) the image data in the document portion D2 (the portion surrounded by the edge portion D1) along the edge portion DE The control unit 1 may crop the range of the circumscribed circle whose center is the center of the document portion D2 and which passes through the four corners of the document portion D2. Then, the control unit 1 rotates the cropped image data on the document portion D2. The control unit 1 uses the center of the cropped image data on the document portion D2 as the axis of rotation. It is assumed that the sub-scanning direction is the X-axis and the main scanning direction is the Y-axis, and when the tilt of the first-side edge L1 is positive, the control unit 1 rotates the image data in a counterclockwise direction. When the tilt of the first-side edge L1 is negative, the control unit 1 rotates the image data in a clockwise direction. The control unit 1 determines the rotation angle (calculates the arctangent) based on the tilt of the first-side edge L1 or the second-side edge L2.

The control unit 1 (the image processing circuitry 12) rotates the cropped image at the determined rotation angle and in the determined rotation direction. Then, the control unit 1 pastes the rotated image data to the job read image data 9. The control unit 1 pastes the rotated image data such that the center of the image data before rotation matches the center of the image data after rotation.

FIG. 18 illustrates an example of correcting the tilt of a document image due to rotation. The control unit 1 (the image processing circuitry 12) may correct the job read image data 9 so that the content of the document is easily viewable.

As described above, the image reading apparatus (the multifunction peripheral 100) according to the embodiment includes the platen 5a, the carriage 6, the moving mechanism 7, the line sensor 63, and the control unit 1. A document is set on the platen 5a. The carriage 6 includes the first lamp 61 and the second lamp 62. The moving mechanism 7 moves the carriage 6 in the sub-scanning direction from a side of the platen 5a on the first side to a side of the platen 5a on the second side in response to the start of reading of the document, the sides being opposed to each other in the sub-scanning direction. The line sensor 63 reads the document based on the reflected light of the first lamp 61 and the second lamp 62. The first lamp 61 and the second lamp 62 are arranged in a row in the sub-scanning direction. The first lamp 61 emits light toward the platen 5a and the set document along the main scanning direction when the first lamp 61 is turned on. The first lamp 61 is located on the second side as compared with the positions of the second lamp 62 and the read line of the line sensor 63 in the sub-scanning direction. The second lamp 62 emits light toward the platen 5a and the set document along the main scanning direction when the second lamp 62 is turned on. The second lamp 62 is located on the first side as compared with the positions of the first lamp 61 and the read line in the sub-scanning direction. The control unit 1 turns on any one of the first lamp 61 and the second lamp 62 during the reading of one line. The control unit 1 recognizes the position of the first-side edge L1 based on the first image data 81 that is the image data read when the first lamp 61 is turned on. The control unit 1 recognizes the position of the second-side edge L2 based on the second image data 82 that is the image data read when the second lamp 62 is turned on. The control unit 1 synthesizes the first image data 81 and the second image data 82 to generate the job read image data 9 that is the image data used for a job. The first-side edge L1 is an edge on the first side out of the document edges opposed to each other in the sub-scanning direction. The second-side edge L2 is an edge on the second side out of the document edges opposed to each other in the sub-scanning direction.

When only the first lamp 61 is turned on, it is possible to obtain the image data in which the shadow at the first-side edge L1 in the sub-scanning direction is emphasized. As a determination is made based on the image data (the first image data 81) obtained when only the first lamp 61 is turned on, the position of the first-side edge L1 of the document may be accurately recognized. Further, when only the second lamp 62 is turned on, it is possible to obtain the image data in which the shadow at the second-side edge L2 of the document is emphasized. As a determination is made based on the image data (the second image data 82) obtained when only the second lamp 62 is turned on, the position of the second-side edge L2 of the document may be accurately recognized.

With only the scanning corresponding to one surface of the document, it is possible to recognize the position of an edge of the document and also obtain the image data used for a job. There is no need to separately execute pre-scanning and document reading as before. In other words, there is no need to execute scanning corresponding to multiple surfaces of the document. The time it takes to acquire the image data on one sheet of paper may be shortened. Furthermore, as there is no increase in the number of times reading is executed during the reading of one line, the reading speed is not decreased. When the position of the edge of the document is detected, the time it takes to acquire the image data on one sheet of paper may be shortened than before.

In a case where the first lamp 61 is turned on to read one line, the control unit 1 turns on the second lamp 62 during the reading of the subsequent line. In a case where the second lamp 62 is turned on to read one line, the control unit 1 turns on the first lamp 61 during the reading of the subsequent line. The first lamp 61 and the second lamp 62 are alternately turned on for each line so as to read a document. The image data may be obtained due to the alternate emission of the first lamp 61 and the second lamp 62.

The control unit 1 uses the first image data 81 and the second image data 82 to arrange the main scanning line data 80, which is the image data on a line in the main scanning direction, in the reading order. The control unit 1 synthesizes the n-th main scanning line data 80 and the (n+1)-th main scanning line data 80 out of the alternately arranged main scanning line data 80 to generate n-th synthetic line data 90. The control unit 1 repeatedly generates the synthetic line data 90 for all the arranged main scanning line data 80. The control unit 1 uses the image data in which the generated synthetic line data 90 are arranged in order as the job read image data 9. Here, n is a positive integer. The job read image data 9 does not only include the first image data 81 or the second image data 82. The first image data 81 and the second image data 82 may be synthesized to obtain the job read image data 9. The job read image data 9 with a sufficient resolution may be obtained. Even when there is a slight difference between the emission characteristics of the first lamp 61 and the emission characteristics of the second lamp 62, the job read image data 9 less affected by the difference in the emission characteristics may be obtained, as compared to a case where the main scanning line data 80 are simply arranged in the reading order. The synthesis is unlikely to cause a stripped pattern due to the characteristics difference as compared to a case where the main scanning line data 80 are simply arranged in the reading order.

To generate the synthetic line data 90, the control unit 1 uses the average value of the pixel values of the pixels at the identical position in the main scanning direction in the main scanning line data 80 on two lines as the pixel value of the pixel at the identical position in the main scanning direction in the synthetic line data 90. The line data obtained by averaging the pixel values of the main scanning line data 80 on the two lines may be used as the synthetic line data 90. It is possible to obtain the job read image data 9 less affected by the emission characteristics difference between the first lamp 61 and the second lamp 62 and having a high image quality.

The control unit 1 recognizes the edge portion D1 of the document in the job read image data 9 based on the recognized positions of the first-side edge L1 and the second-side edge L2. The control unit 1 rotates the document portion D2 in the job read image data 9 based on the recognized edge portion D1 to correct the tilt of the document. The tilt of the document may be accurately corrected in accordance with an accurate determination result of the edge portion D1 (edge). Even when the set document is tilted, the tilt of the image of the document portion D2 may be automatically corrected in the job read image data 9.

The first lamp 61 and the second lamp 62 include a white light source. The control unit 1 generates the monochrome first image data 81, the monochrome second image data 82, and the monochrome job read image data 9. The monochrome job image data may be obtained at a high speed while the position of the edge of the document is detected.

Although the embodiment of the present disclosure has been described, the scope of the present disclosure is not limited thereto, and various modifications may be made without departing from the gist of the disclosure. For example, in the example described above, the single line sensor 63 is provided. However, the carriage 6 may include line sensors 63 for three colors of R, G, and B. In this case, color image data may be obtained. Furthermore, the carriage 6 may include four or more line sensors 63.

The present disclosure is applicable to an image reading apparatus.

What is claimed is:

1. An image reading apparatus comprising:
a platen on which a document is set;
a carriage including a first lamp and a second lamp;
a moving mechanism that includes a motor and moves the carriage in a sub-scanning direction from a side of the platen on a first side to a side of the platen on a second side in response to start of reading of the document, the sides being opposed to each other in the sub-scanning direction;
a line sensor that reads the document based on reflected lights of the first lamp and the second lamp; and
a control unit that includes a CPU (central processing unit) to effect control of the image reading apparatus, wherein
the first lamp and the second lamp are arranged in a row in the sub-scanning direction,
the first lamp
emits light toward the platen and the set document along a main scanning direction when the first lamp k turned on, and
is located on the second side as compared with positions of the second lamp and a read line of the line sensor in the sub-scanning direction,
the second lamp
emits light toward the platen and the set document along the main scanning direction when the second lamp is turned on, and
is located on the first side as compared with positions of the first lamp and the read line in the sub-scanning direction,
the control unit
alternately, turns on the first lamp and the second lamp, wherein turning on the first lamp during reading of odd-numbered lines and turning on the second lamp during reading of even-numbered lines, during one reading of the document by the moving mechanism,
recognizes a position of a first-side edge based on first image data that is image data read when the first lamp is turned on during the one reading of the document,
recognizes a position of a second-side edge based on second image data that is image data read when the second lamp is turned on during the one reading of the document, and
synthesizes the first image data and the second image data, read during the one reading of the document by alternately turning on the first lamp during the reading of odd-numbered lines and the second lamp during the reading of even-numbered lines, to generate job read image data that is image data used for a job,
the first-side edge is an edge of the document on the first side out of edges opposed to each other in the sub-scanning direction, and the second-side edge is an edge of the document on the second side out of the edges opposed to each other in the sub-scanning direction.

2. The image reading apparatus according to claim 1, wherein the control unit
in a case where the first lamp is turned on to read one line, turns on the second lamp during reading of a subsequent line, and
in a case where the second lamp is turned on to read one line, turns on the first lamp during reading of a subsequent line.

3. The image reading apparatus according to claim 1, wherein the control unit
uses the first image data and the second image data to arrange main scanning line data, which is image data on a line in the main scanning direction, in a reading order,
synthesizes the n-th main scanning line data and the (n+1)-th main scanning line data out of the alternately arranged main scanning line data to generate n-th synthetic line data,
repeatedly generates the synthetic line data for all the arranged main scanning line data,
uses image data in which the generated synthetic line data are arranged in order as the job read image data, and
n is a positive integer.

4. The image reading apparatus according to claim 3, wherein, to generate the synthetic line data, the control unit uses an average value of pixel values of pixels at an identical position in the main scanning direction in the main scanning line data on two lines as a pixel value of a pixel at an identical position in the main scanning direction in the synthetic line data.

5. The image reading apparatus according to claim 1, wherein the control unit
recognizes an edge portion of the document in the job read image data based on the recognized positions of the first-side edge and the second-side edge, and
rotates a document portion in the job read image data based on the recognized edge portion to correct a tilt of the document.

6. The image reading apparatus according to claim 1, wherein
the first lamp and the second lamp include a white light source, and
the control unit generates the monochrome first image data, the monochrome second image data, and the monochrome job read image data.

7. An image reading apparatus comprising:
a platen on which a document k set;
a carriage including a first lamp and a second lamp;
a moving mechanism that includes a motor and moves the carriage in a sub-scanning direction from a side of the platen on a first side to a side of the platen on a second side in response to start of reading of the document, the sides being opposed to each other in the sub-scanning direction;
a line sensor that reads the document based on reflected lights of the first lamp and the second lamp; and
a control unit that includes a CPU (central processing unit) to effect control of the image reading apparatus, wherein
the first lamp and the second lamp are arranged in a row in the sub-scanning direction,
the first lamp
emits light toward the platen and the set document along a main scanning direction when the first lamp k turned on, and is located on the second side as compared with positions of the second lamp and a read line of the line sensor in the sub-scanning direction, the second lamp emits light toward the platen and the set document along the main scanning direction when the second lamp is turned on, and is located on the first side as compared with positions of the first lamp and the read line in the sub-scanning direction, the control unit turns on any one of the first lamp and the second lamp during reading of one line, recognizes a position of a first-side edge based on first image data that is image data read when the first lamp is turned on, recognizes a position of a second-side edge based on second image data that is image data read when the second lamp is turned on, and synthesizes the first image data and the second image data to generate job read image data that is image data used for a job, the first-side edge is an edge of the document on the first side out of edges opposed to each other in the sub-scanning direction, and the second-side edge is an edge of the document on the second side out of the edges opposed to each other in the sub-scanning direction, wherein the control unit uses the first image data and the second image data to arrange main scanning line data, which is image data on a line in the main scanning direction, in a reading order, synthesizes the nth main scanning line data acquired during reading by turning on the first lamp and the (n+1)-th main scanning line data acquired during reading by turning on the second lamp out of the alternately arranged main scanning line data to generate n-th synthetic line data, repeatedly generates the synthetic line data for all the arranged main scanning line data by turning on the first lamp during reading of odd-numbered lines and turning on the second lamp during reading of even-numbered lines, and uses image data in which the generated synthetic line data are arranged in order as the job read image data, and n is a positive integer.

* * * * *